Patented May 5, 1931

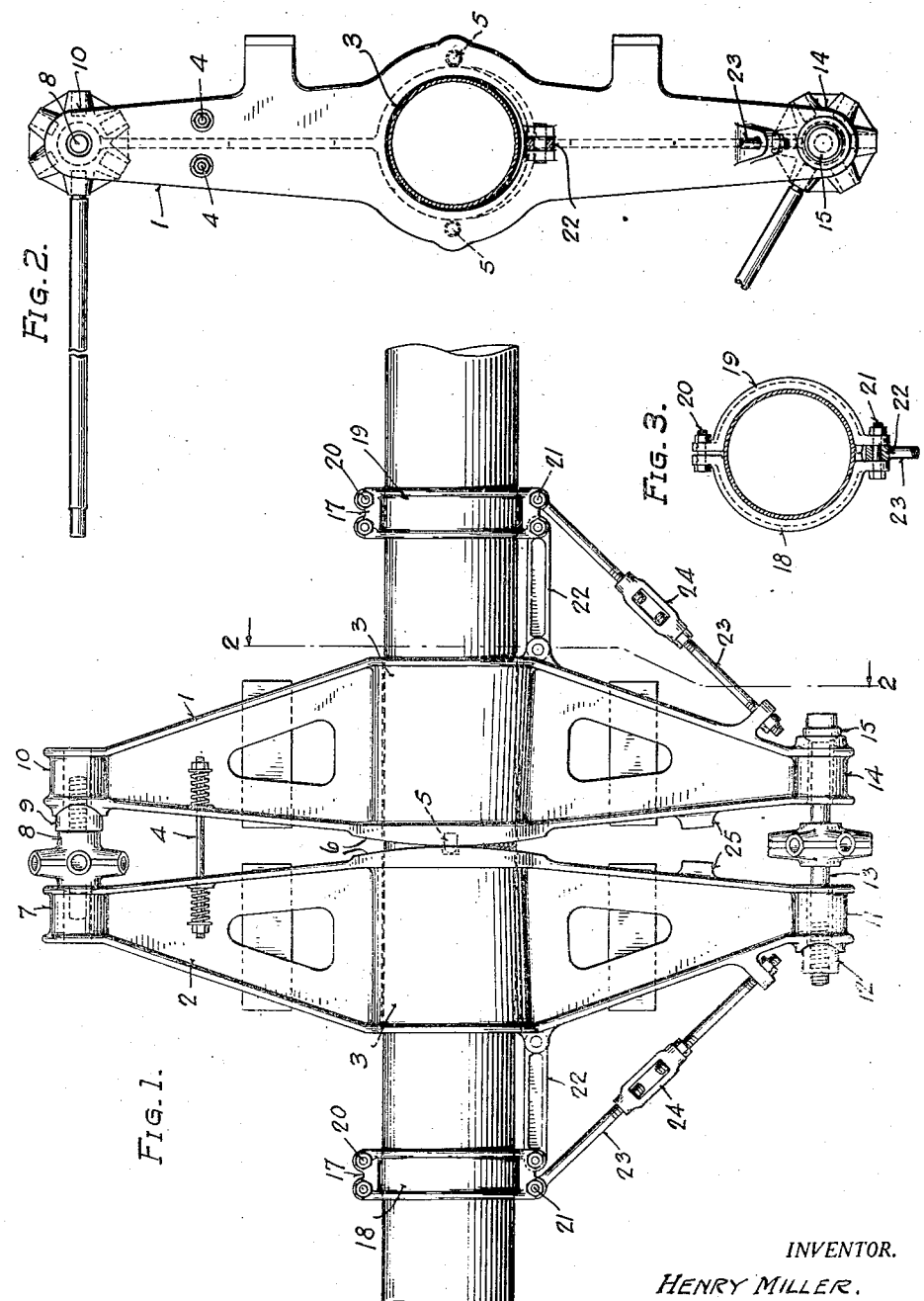

1,804,384

UNITED STATES PATENT OFFICE

HENRY MILLER, OF MILWAUKEE, WISCONSIN, ASSIGNOR TO A. O. SMITH CORPORATION, OF MILWAUKEE, WISCONSIN, A CORPORATION OF NEW YORK

TOOL FOR BENDING TUBULAR ARTICLES

Application filed June 3, 1929. Serial No. 368,065.

This invention relates to a tool for bending elongated tubular articles, such as pipe and the like, the object of the invention being to provide a bending tool which is easy to construct, is simple in operation, is portable in nature, and which may be readily transported and assembled for field operation.

Other objects of the invention will become apparent from the following detailed description and illustration thereof.

The invention may be best understood with reference to the accompanying drawings in which:

Figure 1 is a side elevation thereof.

Fig. 2 is a sectional view taken on line 2—2 of Figure 1.

Fig. 3 is a view of the guide collar showing certain parts in section.

The apparatus comprises a pair of opposed bending arms 1 and 2 of similar construction and having aligned apertures 3 in the center thereof for receiving the pipe or other article to be bent. These arms form levers for bending the pipe and must therefore be properly proportioned in strength and size to withstand the bending pressures. The arms may be retained in aligned position by means of spring pressed bolts 4 and by locating pins 5. The abutting faces 6 of the arms are preferably convex to form rocking surfaces.

The end 7 of the arm 2 is provided with a journal for receiving a threaded member 8 which is adapted to screw into a nut 9 on the adjacent end 10 of the arm 1. The threaded member is preferably provided with a handle receiving spider or other suitable mechanism for rotating the same.

The opposite end 11 of the arm 2 is provided with a nut 12 in which is adapted to be screwed a threaded member 13 extending through the adjacent end 14 of the arm 1 and provided with a head 15 for engaging the same. The threaded member 13 is also provided with suitable means, such as a spider for rotating the same.

Spaced from each of the arms 1 and 2 are guide collars 17 which are adapted to encircle the pipe or other article to be bent. The guide collars preferably comprise a pair of clamping members 18 and 19 secured to each other by any suitable means such as bolts 20 and 21, as is clearly shown in Fig. 3. The collars are connected to the adjacent bending arms by suitable links 22 and bracing arms 23, the latter being provided with turn-buckles 24.

The operation of the device is as follows: The bending arms are assembled at the desired position on the pipe or other tubular article after which the ends 7 and 10 of the arms 1 and 2 may be separated and the arms 11 and 14 may be simultaneously drawn together by means of the screw mechanism hereinbefore described. Double right and left hand threaded screws, power cylinders, or other suitable prime movers may be substituted in lieu of the screw mechanism.

The apparatus is preferably made for the bending of pipe of a given size and pipe of smaller size may be operated upon by providing shims in the apertures 3 to make the apertures smaller. A pair of stops 25 are provided to limit the bending action of the tool at any given place in the pipe.

When it is desired to bend the tubular article to a degree greater than that permitted by the threads of the screw, the apparatus is moved along the pipe a short distance and the bending operation repeated. The apparatus may be readily dismantled by disengaging the screw members 8 and 13 and the spring pressed bolt 4, so that it may be readily transported for field operation.

Having thus described the invention, what is desired to be protected by Letters Patent is:

1. An apparatus for bending articles of substantial length comprising a pair of juxtaposed arms in abutting relation at their centers and diverging outwardly therefrom, said arms having aligned openings therein adapted to receive the article to be bent, and means for relatively moving said diverging arms to apply bending pressures to the article.

2. An apparatus for bending tubular articles comprising a pair of juxtaposed arms having central aligned openings therein, spring pressed means for retaining said arms in aligned position, and means disposed between the adjacent ends of said arms to relatively move the same and thereby apply bending pressures to said tubular article.

3. An apparatus for bending articles of substantial length comprising a pair of juxtaposed arms having central aligned apertures adapted to receive the article to be bent, a collar spaced from each of said arms and connected thereto, and means disposed between the adjacent ends of said arms to relatively move the same and thereby apply bending pressures to the article.

4. An apparatus for bending tubular articles comprising a pair of juxtaposed arms having central aligned openings therein adapted to receive the article to be bent, a clamping collar spaced from each of said arms, link members and bracing means connecting said collar with said arms, means for adjusting the length of said bracing means, threaded means disposed between the adjacent ends of said arms, and means for rotating said threaded means to move said arms relative to each other and thereby apply bending pressures to the tubular article.

5. An apparatus for bending articles of substantial length comprising a pair of juxtaposed arms having central aligned openings therein adapted to receive the article to be bent, said arms being in abutting relation adjacent the aligned openings therein and diverging outwardly from the region of abutting contact, and means for moving the adjacent ends of said arms in directions opposite each other to apply bending pressures to the article.

6. An apparatus for bending tubular articles comprising a pair of arms arranged to pivot upon each other and having central aligned openings therethrough adjacent the pivotal parts thereof for receiving the article to be bent, and means for pivoting said arms in a direction to effect misalignment of said openings to bend the article.

7. An apparatus for bending tubular articles comprising a pair of arms arranged to pivot upon each other and having central aligned openings therethrough adjacent the pivotal parts thereof for receiving the article to be bent, means cooperating with the respective arms for gripping the article at a distance from said arms, and means for pivoting said arms in a direction to effect misalignment of said openings and movement of said first named means to bend the article.

In testimony whereof, I have signed my name at Milwaukee, Wisconsin, this 29th day of May, 1929.

HENRY MILLER.